United States Patent
Marion et al.

(10) Patent No.: US 12,479,951 B2
(45) Date of Patent: Nov. 25, 2025

(54) POLYMERIZABLE AND POLYMER COMPOSITIONS FOR AN OPTICAL MATERIAL HAVING A REFRACTIVE INDEX OF 1.54-1.58, OPHTHALMIC LENS AND MANUFACTURING METHOD

(71) Applicant: Essilor International, Charenton-le-pont (FR)

(72) Inventors: Laurie Marion, Bangkok (TH); Pierre Fromentin, Bangkok (TH)

(73) Assignee: Essilor International, Charenton-le-pont (FR)

( * ) Notice: Subject to any disclaimer, the term of this patent is extended or adjusted under 35 U.S.C. 154(b) by 499 days.

(21) Appl. No.: 18/007,870

(22) PCT Filed: Jun. 2, 2021

(86) PCT No.: PCT/EP2021/064786
§ 371 (c)(1),
(2) Date: Dec. 2, 2022

(87) PCT Pub. No.: WO2021/245133
PCT Pub. Date: Dec. 9, 2021

(65) Prior Publication Data
US 2023/0242701 A1    Aug. 3, 2023

(30) Foreign Application Priority Data
Jun. 4, 2020    (EP) .................................... 20315295

(51) Int. Cl.
*C08G 18/38* (2006.01)
*C08G 18/48* (2006.01)
*C08G 18/75* (2006.01)
*G02B 1/04* (2006.01)

(52) U.S. Cl.
CPC ..... *C08G 18/3876* (2013.01); *C08G 18/4829* (2013.01); *C08G 18/755* (2013.01); *G02B 1/041* (2013.01)

(58) Field of Classification Search
CPC ........... C08G 18/3876; C08G 18/4829; C08G 18/755; G02B 1/041
See application file for complete search history.

(56) References Cited

U.S. PATENT DOCUMENTS

2009/0227745 A1    9/2009    Kohgo et al.
2016/0137840 A1    5/2016    Greszta-Franz et al.
2020/0308400 A1*   10/2020   Hanawa ............. C08G 18/4854

FOREIGN PATENT DOCUMENTS

EP    1925629         12/2011
EP    3438147 B2      2/2019

OTHER PUBLICATIONS

International Search Report in corresponding PCT Application No. PCT/EP2021/064786, mailed Jun. 6, 2021.

* cited by examiner

*Primary Examiner* — Rabon A Sergent
(74) *Attorney, Agent, or Firm* — Norton Rose Fulbright US LLP

(57) ABSTRACT

The invention relates to a polymerizable composition intended to form a polymer composition for an optical material, such as a substrate of an ophthalmic lens, to this polymer composition obtained by polymerizing the polymerizable composition and having a refractive index of from 1.54 to 1.58, to an ophthalmic lens comprising this polymer composition and to a method for manufacturing this optical material. The polymerizable composition has a refractive index of from 1.54 to 1.58, the polymerizable composition comprising: —at least one non-aromatic polyisocyanate compound comprising at least two —NCO groups; —at least one non-aromatic polythiol compound comprising at least two —SH groups; —at least one polyol, According to the invention, said at least one polyol comprises a polyether polyol.

19 Claims, No Drawings

POLYMERIZABLE AND POLYMER COMPOSITIONS FOR AN OPTICAL MATERIAL HAVING A REFRACTIVE INDEX OF 1.54-1.58, OPHTHALMIC LENS AND MANUFACTURING METHOD

CROSS-REFERENCE TO RELATED APPLICATIONS

This application is a national phase application under 35 U.S.C. § 371 of International Application No. PCT/EP2021/064786 filed 2 Jun. 2021, which claims priority to European Patent Application No. 20315295.4 filed 4 Jun. 2020. The entire contents of each of the above-referenced disclosures is specifically incorporated by reference herein without disclaimer.

FIELD OF THE INVENTION

The present invention relates to a polymerizable composition intended to form a polymer composition for an optical material, such as a substrate of an ophthalmic lens, to this polymer composition obtained by polymerizing the polymerizable composition and having a refractive index of from 1.54 to 1.58, to an ophthalmic lens comprising this polymer composition and to a method for manufacturing this optical material. The invention generally applies to optical polymeric materials having a mid-range refractive index of 1.54-1.58, and also to the organic monomers from which they derive.

DESCRIPTION OF RELATED ART

In a known manner, organic substrates for an ophthalmic lens may be made of thermoplastic or thermoset materials.

Thermoplastic materials for an organic lens substrate may commonly be selected from polyamides; polyimide; polysulfones; polycarbonates and copolymers thereof; poly(ethylene terephtalate) and polymethylmethacrylate (PMMA).

Thermoset materials for an organic lens substrate may commonly be selected from:
- cycloolefin copolymers such as ethylene/norbornene or ethylene/cyclopentadiene copolymers;
- homo- and copolymers of allyl carbonates of linear or branched aliphatic or aromatic polyols, such as homopolymers of diethylene glycol bis(allyl carbonate);
- homo- and copolymers of (meth)acrylic acid and esters thereof, which may be derived from bisphenol A;
- polymers and copolymers of thio(meth)acrylic acid and esters thereof;
- polymers and copolymers of allyl esters which may be derived from Bisphenol A or phtalic acids and allyl aromatics such as styrene, polymer;
- copolymers of urethane and thiourethane;
- polymers and copolymers of epoxy; and
- polymers and copolymers of sulfide, disulfide and episulfide.

Homopolymers and copolymers of diethylene glycol bis(allyl carbonate), allylic and (meth)acrylic copolymers, having a refractive index (RI) between 1.54 and 1.58 (commonly referred to as "mid-RI"), are more commonly used for such thermoset materials.

Such acrylic or allylic lens substrates which have a RI of about 1.56 exhibit acceptable optical properties. Nonetheless, a major drawback of such allylic or acrylic type thermoset substrates of mid-RI lenses is that they exhibit poor mechanical properties regarding shock resistance over time. Another drawback of such acrylic/allylic lens substrates resides in the casting process implemented to polymerize the monomers, which knowingly involves several complicated steps to obtain the lens substrates.

Alternatively, it is known to produce polythiourethane-based lens substrates having a higher RI (greater than 1.58, typically of from 1.60 to 1.74) from specific monomers including an alicyclic diisocyanate compound, a polythiol compound and a diol selected from 1,4-butanediol, triethylene glycol and diethylene glycol. Such polythiourethane-based substrates, which are for instance disclosed in EP 1 925 629 B1, have the main drawback of exhibiting a high RI which is always greater than or equal to 1.59, thus being limited to high RIs and not being usable to obtain substrates having a RI of between 1.54 and 1.58.

SUMMARY OF THE INVENTION

An object of the invention is to overcome at least the above-mentioned drawbacks, by providing a lens substrate having at the same time a mid-RI and satisfactory mechanical properties, in particular.

This aim is achieved in that the inventors have just discovered that if a polyol specifically of the polyether polyol family is combined with a non-aromatic polyisocyanate and a non-aromatic polythiol as other monomers, then it is possible to obtain a polymer composition having a RI of from 1.54 to 1.58 based on a modified polythiourethane by mixing these monomers together in the presence of a catalyst and by polymerizing the monomers mixture in a mold, while at the same time surprisingly imparting significantly improved mechanical properties to the polymer composition, as explained below.

A polymerizable composition according to the invention is thus intended to form a polymer composition for an optical material having a refractive index of from 1.54 to 1.58, the polymerizable composition comprising:
- at least one non-aromatic polyisocyanate compound comprising at least two —NCO groups;
- at least one non-aromatic polythiol compound comprising at least two —SH groups;
- at least one polyol,
wherein said at least one polyol comprises a polyether polyol.

By "polyether polyol", it is meant in the present description a polyether of a polyol which comprises at least one polyether block and at least two —OH groups (alcohol functions) linked thereto.

It is to be noted that said polyether polyol not only allows to counterbalance the effect of the polyisocyanate and polythiol monomers on the resulting refractive index of the polymer composition by significantly lowering this refractive index compared to that of a conventional polythiourethane-based composition devoid of a polyether polyol, but also unexpectedly to improve in a significant manner the mechanical properties of the polymer composition compared to those of a "witness" composition derived from both allylic and acrylic monomers as demonstrated in the examples below, by strengthening the resulting modified polythiourethane.

According to a preferred embodiment of the invention, said at least one non-aromatic polythiol comprises at least three —SH groups, and the polymerizable composition further comprises at least one dithiol compound.

In relation to said preferred embodiment, said at least one dithiol compound may be an aliphatic dithiol preferably selected from 1,5-pentanedithiol, 1,4-butanedithiol, 1,3-propanedithiol, 1,10-decanedithiol, 1,2-butanedithiol, 2,3-butanedithiol, 1,6-hexanedithiol and mixtures thereof.

In relation to any of the above features of the invention (including said preferred embodiment), said polyether polyol may have:

a molecular weight greater than 900 g/mol and less than or equal to 2000 g/mol, and/or three to five OH groups.

By way of polyether polyol generally usable in the present invention, mention may be preferably made of a polyether of a polyol which has at least three —OH groups respectively linked to three polyether blocks, each being for instance of formula $(OC_xH_y)_n$, with x and y being integers and n the number of ether repeating units for each polyether block. Preferably, x=3 and y=6.

More preferably, said polyether polyol is selected from glycerol propoxylate, glycerol initiated polyoxypropylene polyols, sorbitol initiated polyoxypropylene polyols, propylene glycol initiated polyoxypropylene polyols, ethylene glycol initiated polyoxypropylene polyols, sucrose-initiated polyoxypropylene polyols and mixtures thereof.

Even more preferably; said polyether polyol of the present invention is a glycerol propoxylate according to formula (I) below:

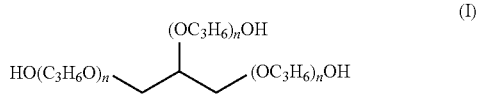
(I)

Also in relation to any of the above-features including said preferred embodiment:

said at least one non-aromatic polyisocyanate compound may be an aliphatic or alicyclic diisocyanate preferably selected from isophorone diisocyanate, 1,3-bis(isocyanatomethyl)cyclohexane, dicyclohexylmethane-4,4'-diisocyanate, butamethylene diisocyanate, pentamethylene diisocyanate, hexamethylene diisocyanate, octamethylene diisocyanate, decamethylene diisocyanate, undecamethylene diisocyanate, trimethyl-1,6-diisocyanatohexane, 1,4-diisocyanatobutane, 1,12-diisocyanatododecane and mixtures thereof; and/or said at least one non-aromatic polythiol compound may be selected from dipentaerythritol hexakis 3-mercaptopropionate, pentaerythritol tetrakis(mercaptoacetate), pentaerythritol tetrakis 3-mercaptoproprionate and mixtures thereof; and/or the molar ratio [SH]:[OH] in the polymerizable composition may be greater than or equal to 5 and less than or equal to 24, and is preferably greater than or equal to 10 and less than or equal to 14; and/or the polymerizable composition may comprise:

35% by weight or more, preferably from 45% to 60%, of said at least one non-aromatic polyisocyanate compound, 20% by weight or more, preferably from 25% to 35%, of said at least one non-aromatic polythiol compound, 1% by weight or more, preferably from 1.5% to 10%, even more preferably from 1.5% to 5%, of said at least one polyether polyol, and optionally in said preferred embodiment, from 10% to 25% of said at least one dithiol compound.

It is in particular to be noted that said ratio [SH]:[OH] is lower than those of many conventional polythiourethane-based composition devoid of a polyether polyol, which contributes to lower the refractive index of the composition of the invention so that it belong to a mid-RI range of between 1.54 and 1.58.

A polymer composition according to the invention is for an optical material having a refractive index of from 1.54 to 1.58, wherein the polymer composition comprises a polymerization product of the polymerizable composition as defined above, obtained in a casting mold thanks to an appropriate catalyst (e.g. a double metal cyanide, referred to as "DMC") and to other usual ingredients for in-mold polymerization such as a releasing agent, a UV absorbing agent, for instance, and after a curing cycle and a post-curing cycle as knowingly implemented for conventional polythiourethanes-based lens substrates.

Advantageously, a polymer composition of the invention may have a glass-transition temperature Tg, measured by Dynamic Mechanical Analysis (DMA) or by Differential Scanning Calorimetry (DSC), which is greater than or equal to 100° C. and less than or equal to 150° C.

Also advantageously, a polymer composition of the invention may have a storage modulus E', measured à 25° C. by Dynamic Mechanical Analysis (DMA), which is greater than or equal to 3.0 GPa.

In the present description (including the examples below):

according to DMA measurements, the E' modulus and Tg are measured by Dynamic Mechanical Analysis using DMA Q800 from TA instruments (3-point bending, heat from 23° C. to 160° C. at 2° C./min); and according to DSC measurements, Tg at midpoint is measured by Differential Scanning Calorimetry (DSC823e Module—Mettler Toledo) with a heating range of 10° C./min from 23° C. to 180° C. under $N_2$ at 50 mL/min.

Such Tg and/or modulus value(s) obtained with the present invention is/are significantly greater than those of known compositions derived from both allylic and acrylic monomers, as demonstrated in the examples below for the "witness composition", which contributes to confer improved mechanical properties on compositions of the invention.

An ophthalmic lens according to the invention comprises a polymer composition as defined above, which preferably forms a substrate of the lens.

The ophthalmic lens may be a spectacle lens such as a polarized lens, a photochromic lens or a solar lens, which may be tinted or not, and be corrective, or not.

This ophthalmic lens may be inserted in spectacle frames or in a head mounted device which may be immersive or non-immersive (in particular see-through devices and see-around devices).

Preferably, the ophthalmic lens of the invention is a corrective spectacle lens or a non-corrective spectacle lens worn in front of the eye, corrective lenses being for instance usable to treat myopia, hyperopia, astigmatism, and presbyopia and being either a single-vision ophthalmic lens or a multifocal ophthalmic lens (for example a progressive addition ophthalmic lens).

A method according to the invention for producing an optical material having a refractive index from 1.54 to 1.58, comprises:

a) mixing in the presence of said catalyst (e.g. a DMC) and possibly other additives such as a releasing agent and a UV absorbing agent:
- at least one non-aromatic polyisocyanate compound comprising at least two —NCO groups;
- at least one non-aromatic polythiol compound comprising at least two —SH groups;
- at least one polyol which comprises a polyether polyol; and
- optionally at least one dithiol compound, in case said at least one non-aromatic polythiol comprises at least three —SH groups, to form a polymerizable composition; and b) polymerizing the polymerizable composition in a mold to obtain a polymer composition forming said optical material.

Advantageously, the obtained polymer composition is then cured, and afterward subjected to a post-curing cycle in a known manner, for instance as conventionally implemented for polythiourethane-based substrate compositions of the prior art.

DETAILED DESCRIPTION OF INVENTION AND PREFERRED EMBODIMENTS

The terms "comprise" (and any grammatical variation thereof, such as "comprises" and "comprising"), "have" (and any grammatical variation thereof, such as "has" and "having"), "contain" (and any grammatical variation thereof, such as "contains" and "containing"), and "include" (and any grammatical variation thereof, such as "includes" and "including") are open-ended linking verbs. They are used to specify the presence of stated features, integers, steps or components or groups thereof, but do not preclude the presence or addition of one or more other features, integers, steps or components or groups thereof. As a result, a method, or a step in a method, that "comprises," "has," "contains," or "includes" one or more steps or elements possesses those one or more steps or elements, but is not limited to possessing only those one or more steps or elements.

Unless otherwise indicated, all numbers or expressions referring to quantities of ingredients, ranges, reaction conditions, etc. used herein are to be understood as modified in all instances by the term "about." Also unless otherwise indicated, the indication of an interval of values «from X to Y» or "between X to Y", according to the present invention, means as including the values of X and Y.

General Usable Features of Optical Lenses According to the Present Invention:

In a known way, an ophthalmic lens according to the invention may comprise a multilayer coating surmounting a front main face of said substrate (a rear main face of the substrate being intended to be adjacent the wearer's eye).

In certain applications, it is preferable for the front main face of the substrate to be coated with one or more functional coatings prior to the deposition of said multilayer coating. These functional coatings, which are conventionally used in optics, may be, non-limitingly, an anti-shock primer layer, an anti-abrasion and/or anti-scratch coating, a polarizing coating, a photochromic coating or a colored coating. Generally, this front main face of the substrate is thus coated with an anti-shock primer layer, an anti-abrasion coating and/or an anti-scratch coating, or an anti-shock primer layer coated with an anti-abrasion and/or anti-scratch coating.

These abrasion- and/or scratch-resistant coatings are preferably hard coatings based on poly(meth)acrylates or silanes generally comprising one or more mineral fillers intended to increase the hardness and/or the refractive index of the coating once cured, and they are preferably produced from compositions comprising at least one alkoxysilane and/or one hydrolysate thereof, for example obtained by hydrolysis with a hydrochloric acid solution and optionally condensation and/or curing catalysts. Mention may be made of coatings based on hydrolysates of epoxysilanes such as those described in documents FR 2702486 (EP 0614957), U.S. Pat. Nos. 4,211,823 and 5,015,523.

The anti-abrasion and/or anti-scratch coating composition may be deposited on the main face of the substrate by dip coating or spin coating. It is then cured using the appropriate process (preferably thermally, or under UV). The thickness of the anti-abrasion and/or anti-scratch coating generally varies from 2 µm to 10 µm, and preferably from 3 µm to 5 µm.

Prior to the deposition of the anti-abrasion and/or anti-scratch coating, it is possible to deposit, on the substrate, a primer coating (also called a tie layer) that improves the resistance to shocks and/or the adhesion of subsequent layers in the final product. This coating may be any anti-shock primer layer conventionally used for articles made of transparent polymer, such as ophthalmic lenses.

Among preferred primer compositions, mention may be made of compositions based on thermoplastic polyurethanes, such as those described in documents JP 63-141001 and JP 63-87223, poly(meth)acrylic primer compositions, such as those described in document U.S. Pat. No. 5,015,523, compositions based on thermoset polyurethanes, such as those described in document EP 0404111 and compositions based on poly(meth)acrylic latex or polyurethane latex, such as those described in documents U.S. Pat. No. 5,316,791 and EP 0680492. Preferred primer compositions are compositions based on polyurethanes and compositions based on latex, in particular polyurethane latexes optionally containing polyester units.

It is also possible to use in the primer compositions blends of these latexes, in particular polyurethane latex and poly(meth)acrylic latex.

These primer compositions may be deposited by dip coating or spin coating then dried at a temperature of at least 70° C., possibly of as high as 100° C., and preferably of about 90° C., for a time of 2 minutes to 2 hours, and generally of about 15 minutes, in order to form primer layers having thicknesses, post-bake, of 0.2 µm to 2.5 µm, and preferably of 0.5 µm to 1.5 µm.

Before the multilayer coating is deposited on the substrate optionally coated for example with an anti-abrasion layer, it is possible to subject the surface of said optionally coated substrate to a chemical or physical activation treatment intended to increase the adhesion of the coating. This pre-treatment is generally carried out under vacuum. It may be a question of a bombardment with energetic species, for example an ion beam (ion precleaning or IPC), of a corona-discharge treatment, of an electron beam, of a UV treatment, or of a treatment by plasma under vacuum, generally an argon or oxygen plasma. It may also be a question of an acid or basic surface treatment and/or of a surface treatment with solvents (water or organic solvent).

The various layers of the multilayer coating and the optional underlayer are preferably deposited by vacuum deposition using one of the following techniques:
  (i) evaporation, optionally assisted by ion beam,
  (ii) ion-beam sputtering,
  (iii) cathode sputtering, or
  (iv) plasma-enhanced chemical vapor deposition.

These various techniques are described in the works "Thin Film Processes" and "Thin Film Processes II" Vossen & Kern, Ed., Academic Press, 1978 and 1991, respectively. One particularly recommended technique is the technique of vacuum evaporation.

Preferably and as indicated above, the deposition of each of the layers of said coating and the optional underlayer is carried out by vacuum evaporation.

The ophthalmic lens of the invention may be made antistatic, i.e. not retain and/or develop an appreciable electrostatic charge, by virtue of the incorporation of at least one electrically conductive layer in said multilayer coating. This electrically conductive layer is preferably located between two layers of said coating, and/or is adjacent to a high-refractive-index layer of this coating. Preferably, this electrically conductive layer is located immediately under a said low-refractive-index layer and ideally forms the penultimate layer of said coating, it being located immediately under the most external (low-index, e.g. silica-based) layer of said coating.

The electrically conductive layer must be sufficiently thin to not after the transparency of said coating, and it is preferably manufactured from a highly transparent electrical conductor. In this case, its thickness varies preferably from 1 nm to 15 nm, and better still from 1 nm to 10 nm. This conductive layer preferably comprises an optionally doped metal oxide, chosen from oxides of indium, of tin, of zinc and mixtures thereof. Indium-tin oxide ($In_2O_3$:Sn for tin-doped indium oxide), aluminum-doped zinc oxide (ZnO:Al), indium oxide ($In_2O_3$) and tin oxide ($SnO_2$) are preferred. Even more preferably, this optically transparent conductive layer is a layer of indium-tin oxide (ITO) or a layer of tin oxide.

An ophthalmic lens according to the invention may also comprise complementary functionalities such as, non-limitingly:
  coatings formed on the external (i.e. exposed) surface of said multilayer inorganic coating and capable of modifying its surface properties, such as for example an anti-fouling or anti-fog top coat (external coating);
  specific filtration functionalities such as for example filtration of the UV, of the blue-violet (400 nm-460 nm), or other visible wavelengths, or IR, within a coating, a laminated film, a wafer in or at the surface of the substrate or directly integrated into the substrate either through tinting or in mass in the polymer; and/or
  a polarizing function.

By way of anti-fouling coatings, which may typically be hydrophobic and/or oleophobic and which have a thickness in general smaller than or equal to 10 nm, preferably of 1 nm to 10 nm, and better still of 1 nm to 5 nm, mention may be made of coatings of fluorosilane or fluorosilazane type which may be obtained by depositing a fluorosilane or fluorosilazane precursor, preferably comprising at least two hydrolysable groups per molecule. The precursor fluorosilanes preferably contain fluoropolyether groups and better still perfluoropolyether groups.

Thus, an ophthalmic lens according to the invention may for example comprise a substrate coated in succession on its front main face with an anti-shock primer layer, an anti-abrasion and/or anti-scratch layer, said multilayer coating and a hydrophobic and/or oleophobic top coat.

As for the rear main face of the substrate, it may for example be coated, in succession, with an anti-shock primer layer, an anti-adhesion and/or anti-scratch layer, an antireflection coating preferably with a low reflectance in the domain of the UV and a hydrophobic and/or oleophobic coating.

The following examples illustrate the present invention in a more detailed, but non-limiting manner.

EXAMPLE 1

A polymer composition according to the invention was prepared in the following manner detailed in Table 1 below, by first preparing two separate parts A and B each consisting of the following ingredients (each being identified by its function, chemical tradename, supplier, CAS number and mass fraction in the whole mixture of monomers and other additives forming the polymerizable composition).

TABLE 1

| | Function | Chemical name | Supplier | CAS number | Content (% wt) |
|---|---|---|---|---|---|
| Part A | Releasing agent | Zelec UN | Stepan | N/A | 0.7794 |
| | Catalyst | DMC | | 753-73-1 | 0.0390 |
| | UV Absorber | Seesorb 701B | Shipro Kasei | 2440-22-4 | 1.7537 |
| | Diisocyanate | IPDI | Vencorex | 4098-71-9 | 53.4086 |
| Part B | Polythiol | PTMA | TCI | 10193-99-4 | 25.9566 |
| | Dithiol | 1,6 hexanedithiol | TCI | 1191-43-1 | 16.2564 |
| | Polyether polyol | Daltolac YT310 | Huntsman | 25791-96-2 | 1.8063 |

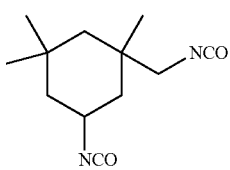

IPDI: Isophorone diisocyanate

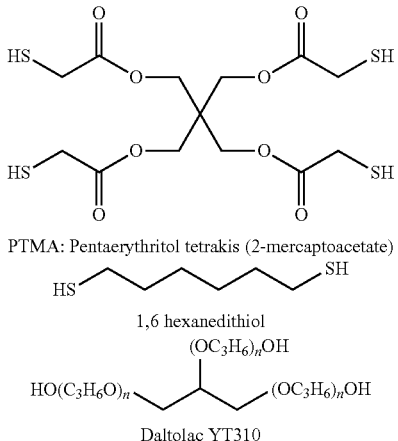

PTMA: Pentaerythritol tetrakis (2-mercaptoacetate)

HS~~~~~~SH 1,6 hexanedithiol

HO(C$_3$H$_6$O)$_n$~~~~(OC$_3$H$_6$)$_n$OH with (OC$_3$H$_6$)$_n$OH branch

Daltolac YT310

The polymerizable composition consisting of the above-identified parts A and B was prepared according to the successive steps below:

1) Preparing Part A by mixing together the diisocyanate and the additive package consisting of the releasing agent, UV absorber and catalyst until complete dissolution of the UV absorber.
2) Preparing Part B by mixing together the polythiol, dithiol and polyether polyol.
3) Mixing Part A and Part B at a temperature of less than 11° C. for 1 hour under vacuum.
4) Purging the N$_2$ gas to replace the vacuum, before adding part B and continue stirring the mixture for 10 minutes at 0° C.
5) Degassing for 45 minutes with low speed mixing and degassing for 15 minutes without stirring.
6) Releasing vacuum by N$_2$ gas.
7) Filling the mixture of monomers and additives into a mold by a cleaned syringe.

The polymerization reaction was carried out in a regulated electronic oven according to the following cycle: 8 hours at about 10-20° C., regular temperature increase from 20° C. to 130° C. during 9 hours at about 5° C./hour to 25° C./hour, and 6 hours at about 120-130° C.

Table 2 below recites some physical properties of the obtained lens substrates according to the invention, in terms of refractive indexes $n_D$ and $n_E$ and Abbe numbers $V_D$ and $V_E$, all measured thanks to a Prism Coupler.

TABLE 2

|  | $n_D$ | $n_E$ | $V_D$ | $V_E$ |
|---|---|---|---|---|
| First substrate of the invention | 1.554 | 1.557 | 42 | 42 |

Table 3 below recites the cosmetic characterization of the obtained lens substrates according to the invention, measured thanks to a Cary machine. No color-balancing was added to the mixture.

TABLE 3

|  | UV cut | TvD65 | YI | L* | a* | b* | C* | h* |
|---|---|---|---|---|---|---|---|---|
| First substrate of the invention | 396 | 89.495 | 2.01 | 95.765 | −0.625 | 1.395 | 1.525 | 114.25 |

Table 4 below recites some mechanical properties of the obtained lens substrate according to the invention.

TABLE 4

|  | Modulus E' measured at 25° C. | Tg measured by Dynamic Mechanical Analysis (DMA: tan δ) | Tg measured by Differential Scanning Calorimetry (DSC: onset/midpoint) |
|---|---|---|---|
| First substrate of the invention | 3.3 GPa | 128° C. | 106° C./113° C. |

The whole measured physical, mechanical and cosmetic parameters of the lens substrates of the invention, as well as their castability in terms of process, have been recited and compared, where possible in Table 5 below, to the same parameters and castability of a prior art lens substrate "1.56 market selection" made of a specific "witness" polymer composition referred above. This "witness" polymer composition "1.56 market selection" was derived from both allylic and acrylic monomers.

TABLE 5

|  | Method | Measurement | substrate "1.56 market Selection" | First substrate of the invention | Remarks |
|---|---|---|---|---|---|
| Physical parameters | | | | | |
| Refractive index ($n_D$) | Prism coupler | ASTM D542 nD20, 20°C | 1.549 | 1.554 | ok |
| Refractive index ($n_E$) | | | 1.552 | 1.557 | ok |
| Abbe number ($V_D$) | | | 42 | 42 | ok |
| Abbe number ($V_E$) | | | 40 | 42 | better |
| Density | — | ASTM D792 | 1.24 | — | — |
| Exotherm | DSC | — | <6 J/g | 0 | ok |
| Mechanical parameters | | | | | |
| Modulus E' (25° C.) | DMA | Internal | 3.0 | 3.3 | better |
| Tg | DMA | | 80-110° C. (91° C.) | 128 | better |
| Tg | DSC | | 80-110° C. (89° C.) | 113 | better |
| CTE before Tg | Displacement probe | Internal | 100-140 (116) | — | — |
| CTE after Tg | (μm/m · C°) | | 180-200 (190) | — | — |
| Impact test (FDA & CEN) | — | 21 CFR 801.410 | Not pass | — | — |
| RedT | Internal | — | 30 | — | — |
| Cosmetic parameters | | | | | |
| $T_{vd65}$ for UVcut > 390 nm | Cary60 | At 2 mm, 380-780 nm, UNC | 89% | 89.5 | ok |
| Haze | Hazegard | ASTM D1003 | <0.5% | — | — |
| Photostab. substrate (ΔE) | Q-sun 80 h | Internal | — | — | — |

These measurements mainly show overall better performances for the polythiourethane-based lens substrates of the invention having an IR of about 1.56, compared to the allylic/acrylic-derived lens substrate "1.56 market selection". In particular, the substrates of this first example of the invention exhibit an improved mechanical resistance to shocks in comparison with that of this "witness" allylic/acrylic-derived substrate.

EXAMPLE 2

Another polymer composition according to the invention was prepared in the following manner detailed in Table 6 below, by first preparing two separate parts A and B each consisting of the following ingredients (each being identified by its function, chemical tradename, supplier, CAS number and mass fraction in the whole mixture of monomers and other additives forming the polymerizable composition).

TABLE 6

|  | Function | Chemical name | Supplier | CAS number | Content (% wt) |
|---|---|---|---|---|---|
| Part A | Releasing agent | Zelec UN | Stepan | N/A | 0.7794 |
| | Catalyst | DMC | | 753-73-1 | 0.0390 |
| | UV Absorber | Seesorb 701B | Shipro Kasei | 2440-22-4 | 1.7537 |
| | Diisocyanate | IPDI | Vencorex | 4098-71-9 | 51.6054 |
| Part B | Polythiol | Pentaerythirol tetrakis(3-mercaptoproprionate) | Sigma-Aldrich | 7575-23-7 | 28.3696 |
| | Dithiol | 1,6 hexanedithiol | TCI | 1191-43-1 | 13.9623 |
| | Polyether polyol | Daltolac YT310 | Huntsman | 25791-96-2 | 3.4905 |

The polymerizable composition consisting of the above-identified parts A and B was prepared as specified in example 1 above.

Table 7 below recites some physical properties of the obtained lens substrate according to this second example of invention, in terms of refractive indexes $n_D$ and $n_E$ and Abbe numbers $V_D$ and $V_E$, all measured thanks to a Prism Coupler.

TABLE 7

|  | $n_D$ | $n_E$ | $V_D$ | $V_E$ |
|---|---|---|---|---|
| Second substrate of the invention | 1.550 | 1.553 | 42 | 42 |

Table 8 below recites the cosmetic characterization of the obtained lens substrate according to this second example of the invention, measured thanks to a Cary machine. No color-balancing was added to the mixture.

TABLE 8

|  | UV cut | TvD65 | YI | L* | a* | b* | C* | h* |
|---|---|---|---|---|---|---|---|---|
| First substrate of the invention | 396 | 90.785 | 1.865 | 96.305 | −0.55 | 1.27 | 1.385 | 113.35 |

Table 9 below recites some mechanical properties of the obtained lens substrate according to this second example of the invention.

TABLE 9

|  | Modulus E' measured at 25° C. | Tg measured by Dynamic Mechanical Analysis (DMA: tan δ) | Tg measured by Differential Scanning Calorimetry (DSC: onset/midpoint) |
|---|---|---|---|
| Second substrate of the invention | 3.0 GPa | 115°C | 106° C./112° C. |

These measurements also show better performances for the polythiourethane-based second substrate of the invention having an IR of about 1.56, compared to the allylic/acrylic-derived lens substrate "1.56 market selection", with markedly an improved mechanical resistance to shocks in comparison with that of this "witness" allylic/acrylic-derived substrate.

The invention claimed is:

1. A polymerizable composition intended to form a polymer composition for an optical material having a refractive index of from 1.54 to 1.58, the polymerizable composition comprising:
   at least one non-aromatic polyisocyanate compound comprising at least two —NCO groups;
   at least one non-aromatic polythiol compound comprising at least three —SH groups;
   at least one polyol, and
   at least one dithiol compound;
   wherein said at least one polyol comprises a polyether polyol.

2. The polymerizable composition according to claim 1, wherein said at least one dithiol compound is an aliphatic dithiol.

3. The polymerizable composition according to claim 2, wherein said at least one dithiol compound is selected from 1,5-pentanedithiol, 1,4-butanedithiol, 1,3-propanedithiol, 1,10-decanedithiol, 1,2-butanedithiol, 2,3-butanedithiol, 1,6-hexanedithiol and mixtures thereof.

4. The polymerizable composition according to claim 1, wherein said polyether polyol has a molecular weight greater than 900 g/mol and less than or equal to 2000 g/mol.

5. The polymerizable composition according to claim 1, wherein said polyether polyol has three to five OH groups.

6. The polymerizable composition according to claim 1, wherein said polyether polyol is selected from glycerol propoxylate, glycerol initiated polyoxypropylene polyols, sorbitol initiated polyoxypropylene polyols, propylene glycol initiated polyoxypropylene polyols, ethylene glycol initiated polyoxypropylene polyols, sucrose-initiated polyoxypropylene polyols and mixtures thereof.

7. The polymerizable composition according to claim 1, wherein said at least one non-aromatic polyisocyanate compound is an aliphatic or alicyclic diisocyanate.

8. The polymerizable composition according to claim 7, wherein said at least one non-aromatic polyisocyanate compound is selected from isophorone diisocyanate, 1,3-bis(isocyanatomethyl)cyclohexane, dicyclohexylmethane-4,4'-diisocyanate, butamethylene diisocyanate, pentamethylene diisocyanate, hexamethylene diisocyanate, octamethylene diisocyanate, decamethylene diisocyanate, undecamethylene diisocyanate, trimethyl-1,6-diisocyanatohexane, 1,4-diisocyanatobutane, 1,12-diisocyanatododecane and mixtures thereof.

9. The polymerizable composition according to claim 1, wherein said at least one non-aromatic polythiol compound is selected from dipentaerythritol hexakis 3-mercaptopropionate, pentaerythritol tetrakis(mercaptoacetate), pentaerythritol tetrakis 3-mercaptoproprionate and mixtures thereof.

10. The polymerizable composition according to claim 1, wherein the molar ratio [SH]:[OH] in the polymerizable composition is greater than or equal to 5 and less than or equal to 24.

11. The polymerizable composition according to claim 10, wherein the molar ratio [SH]:[OH] in the polymerizable composition is greater than or equal to 10 and less than or equal to 14.

12. The polymerizable composition according to claim 1, wherein the polymerizable composition comprises:
   35% by weight or more of said at least one non-aromatic polyisocyanate compound, based on a total weight of the polymerizable composition;
   20% by weight or more of said at least one non-aromatic polythiol compound, based on the total weight of the polymerizable composition; and
   1% by weight or more of said at least one polyether polyol, based on the total weight of the polymerizable composition.

13. The polymerizable composition according to claim 12, wherein the polymerizable composition comprises:
   from 45% to 60% of said at least one non-aromatic polyisocyanate compound, based on the total weight of the polymerizable composition;
   from 25% to 35% of said at least one non-aromatic polythiol compound, based on the total weight of the polymerizable composition; and
   from 1.5% to 5% of said at least one polyether polyol, based on the total weight of the polymerizable composition.

14. A polymer composition for an optical material having a refractive index of from 1.54 to 1.58, wherein the polymer composition comprises a polymerization product of the polymerizable composition according to claim 1.

15. The polymer composition according to claim 14, wherein the polymer composition has a glass-transition temperature Tg, measured by Dynamic Mechanical Analysis (DMA) or by Differential Scanning Calorimetry (DSC), which is greater than or equal to 100° C. and less than or equal to 150° C.

16. The polymer composition according to claim 14, wherein the polymer composition has a storage modulus E', measured á 25° C. by Dynamic Mechanical Analysis (DMA), which is greater than or equal to 3.0 GPa.

17. An ophthalmic lens comprising the polymer composition of claim 14.

18. The ophthalmic lens according to claim 17, wherein the composition forms a substrate of the lens.

19. A method for producing an optical material having a refractive index from 1.54 to 1.58, the method comprising:
  a) mixing:
    at least one non-aromatic polyisocyanate compound comprising at least two —NCO groups;
    at least one non-aromatic polythiol compound comprising at least three —SH groups;
    at least one polyol which comprises a polyether polyol; and
    at least one dithiol compound
  to form a polymerizable composition; and
  b) polymerizing the polymerizable composition in a mold to obtain a polymer composition forming said optical material.

* * * * *